United States Patent [19]
Liskowitz et al.

[11] Patent Number: 5,975,798
[45] Date of Patent: Nov. 2, 1999

[54] IN-SITU DECONTAMINATION OF SUBSURFACE WASTE USING DISTRIBUTED IRON POWDER

[75] Inventors: John J. Liskowitz, Sea Girt, N.J.; Toshimune Kimura, Musashino; Jun Ogata, Chiba, both of Japan

[73] Assignees: ARS Technologies, Inc., Highland Park, N.J.; Dowa Mining Co., Ltd., Japan

[21] Appl. No.: 08/922,042

[22] Filed: Sep. 2, 1997

[51] Int. Cl.$^6$ .................................. A63D 3/00; B09C 1/08
[52] U.S. Cl. .................. 405/128; 210/747; 210/757; 588/224; 588/248; 405/263
[58] Field of Search .................... 166/279, 310, 166/371; 210/747, 757, 908, 912, 913; 588/206, 224, 236, 248, 256; 405/128, 263

[56] References Cited

U.S. PATENT DOCUMENTS

| | | | |
|---|---|---|---|
| 4,830,766 | 5/1989 | Gallup et al. ................... | 166/310 X |
| 5,318,116 | 6/1994 | Vinegar et al. .................. | 405/128 X |
| 5,362,402 | 11/1994 | Haitko et al. .................... | 210/757 |
| 5,447,639 | 9/1995 | Sivavec ........................... | 210/747 |
| 5,534,154 | 7/1996 | Gillham .......................... | 210/747 X |
| 5,616,253 | 4/1997 | Fernando et al. ................ | 405/128 X |
| 5,730,550 | 3/1998 | Andersland et al. ............. | 405/128 |
| 5,750,036 | 5/1998 | Sivavec ........................... | 210/747 |
| 5,789,649 | 8/1998 | Batchelor et al. ................ | 588/206 |
| 5,857,810 | 1/1999 | Cantrell et al. .................. | 405/263 |

*Primary Examiner*—George Suchfield

[57] ABSTRACT

A method for the in-situ remediation of contaminants including soluble metals more noble than iron and halogenated hydrocarbons that are present in groundwater, absorbed to soil, and exist in the free product state in a soil volume. An inert pressurized gas in combination with an atomized iron powder-water slurry is used to inject pre-determined quantities of reactive zero valent iron powder relative to the quantity of contaminants present in the soil for obtaining preselected rates of remediation with minimum quantities of iron powder and with reaction products within a preferred acidic pH range. Features, such as particle surface area and carbon content, are identified that enhance the reactivity of the iron powder.

5 Claims, 3 Drawing Sheets

IN-SITU DECONTAMINATION OF SUBSURFACE WASTE USING DISTRIBUTED IRON POWDER

BACKGROUND OF THE INVENTION

This invention relates to in-situ remediation technology using zero valent iron powder for cleanup of industrially generated toxic heavy metal cations and halogenated hydrocarbons in subsurface geological formations.

Industrial manufacturing activities concerning inorganic chemicals, batteries, coil coating, leather tanning and finishing, electrical/electronic components, foundries, iron and steel, photographic equipment and supplies, metal plating and finishing, non-ferrous metals, mining, paint and ink formulators employ raw materials and produce wastes that contain such heavy metals as cadmium, chromium, lead, nickel, and copper. These industries also employ fire resistant halogenated solvents such as trichloroethylene or tetrachioroethylene for cleaning and degreasing operations. Spills, leaking storage tanks and pipe lines, or improper disposal of waste containing these hazardous materials can lead to subsurface soil and groundwater contamination. This occurs as a result of these chemicals migrating into the subsurface soil and groundwater with infiltrating rainfall. Exposure to these contaminants in subsurface soils and groundwater can pose a serious hazard to human health.

The following technology is currently being used for remediation of subsurface toxic heavy metal cations and halogenated hydrocarbons in geological formations.

Remediation of subsurface toxic heavy metal cations and halogenated hydrocarbons present in saturated soils and groundwater can be achieved by transferring the dissolved heavy metal cations and anions and halogenated hydrocarbon present in groundwater to the surface for treatment using conventional chemical and physical processes. The mobility of the non-soluble or undissolved phase heavy metal cations and anions and halogenated hydrocarbons can be increased for improved recovery through addition of surfactant and chelating agents to increase their solubility in the groundwater.

Improvements in technologies for use in geological formations that are dense and exhibit low permeability and hydraulic conductivity have been accomplished through the use of pneumatic fracturing using compressed gases, as shown in U.S. Pat. No. 5,032,042, the subject matter of which is incorporated herein by reference, and hydraulic fracturing using liquid and a fracture maintaining or proppant material as the injection fluid. These technologies create fractures or preferential flow channels within low permeability geological formations through which volatilized and dissolved halogenated hydrocarbons can be removed for surface treatment.

However, there exist several inherent disadvantages associated with the use of these technologies which require above-ground treatment. Since above-ground surface structures and treatment systems must be erected on site to treat the recovered extracted vapors or liquids from the subsurface formations, considerable costs associated with installation and operation can result. Also, the presence of these above-ground structures and treatment systems limit the use and accessibility of the property during the remediation operations.

Remediation technologies that are applied in-situ can overcome the disadvantages associated with the above-ground treatment systems.

In-situ bioremediation uses indigenous and/or mixed proprietary microorganism supplied with needed nutrients, moisture, and environment to biodegrade in-situ the halogenated hydrocarbons with desirable rates. Microorganism growth within the subsurface contaminated zones can be achieved by supplying additional microorganisms, nutrients, and moisture, altering environmental conditions (pH, etc.) and atmosphere through injection of air oxygen microbubbles, nitrogen, etc. In-situ delivery systems such as gas injection, hydraulic injection or hollow shaft auger drills with extended nozzles have been used creating in-situ environments for the microbial activity to flourish.

There exist several disadvantages associated with the use of in-situ bioremediation of halogenated hydrocarbons. Only low levels of soluble halogenated hydrocarbon can be remediated, since high concentrations of hydrocarbons can be toxic to the microorganisms. For example, microorganisms will not completely remove the chlorine atom from trichloroethylene if its concentration exceeds 30 parts per million (ppm) in water. Also, in-situ biodegradation of halogenated hydrocarbons is difficult to achieve because a combination of anaerobic (metabolism in absence of oxygen) and aerobic (metabolism requires oxygen) microorganisms are needed to degrade these organic compounds. Also, microbial clogging can occur around boreholes, which reduces the ability of the delivery system to provide needed nutrients and create an environment required to maintain subsurface microbial activity.

Additionally, treatment of soluble heavy metal ions and halogenated hydrocarbons in groundwater can be carried out using iron powder, granular iron metal filings or iron chips. All of these technologies rely on the use of beds or reactive walls containing large quantities of permanent or replaceable iron located solely within the saturated zone of a geological formation and where treatment occurs solely downstream of the ground water passing through sources of upstream heavy metal cations and halogenated hydrocarbons upstream in the formation. Large quantities of iron are used to insure that the contaminated groundwater flowing through the iron is remediated within the time required for the contaminated groundwater to pass through the bed or reactive wall.

Typically, the bed or reactive wall is designed so that it creates a more permeable flow area within the contaminated groundwater flow pattern. As the contaminated groundwater flows through the bed of iron filings, contact between the iron and the soluble contaminants results in dechlorination of the halogenated hydrocarbons and the reduction of the heavy metal ions to significantly less hazardous forms. Some of these technologies renew the iron bed material periodically to maintain its reactivity in reducing the heavy metal ions and halogenated hydrocarbons.

Although the iron bed or reaction wall methods are effective in reducing toxic heavy metal cations more noble than iron and halogenated hydrocarbons to desired levels in the ground water, the processes do not provide any treatment of the non-soluble phase contamination that may exist in the geological formation. Also, the contaminants in the soil being treated must be included within the ground water flowing through the permeable ion treatment beds or wall to be treated. In geological formations that exhibit complex groundwater flows, placement of the beds or reactive walls to intercept all contaminated groundwater flow is difficult to achieve. Additionally, the practice of utilizing large quantities of iron gives rise to significant reduction of ground water which is accompanied by the undesirable production of excess quantities of hydrogen that could lead to hazardous conditions in confined environments.

SUMMARY OF THE INVENTION

Pre-selected quantities of zero valent powder are injected directly into subsurface sources of contamination by means of deep tilling, hydraulic injection or multi-phase inert gas ( such as nitrogen)/water injection.

Selection of injection technology is dependent upon the density of the formation. For low density formations such as sand, deep tilling is used. For dense formations such as clay and fracture shale, or rock, hydraulic injection or multi-phase gas/water injection is employed.

Preferably, utilizing minimal quantities of iron powder results in both cost reduction and avoidance of generating excessive explosive hydrogen releases. Techniques for selecting both the quantity of iron powder to be injected and the powder's physical parameters which enhance its reactivity are described hereinafter.

DESCRIPTION OF PREFERRED EMBODIMENTS OF THE INVENTION

Figure 1:
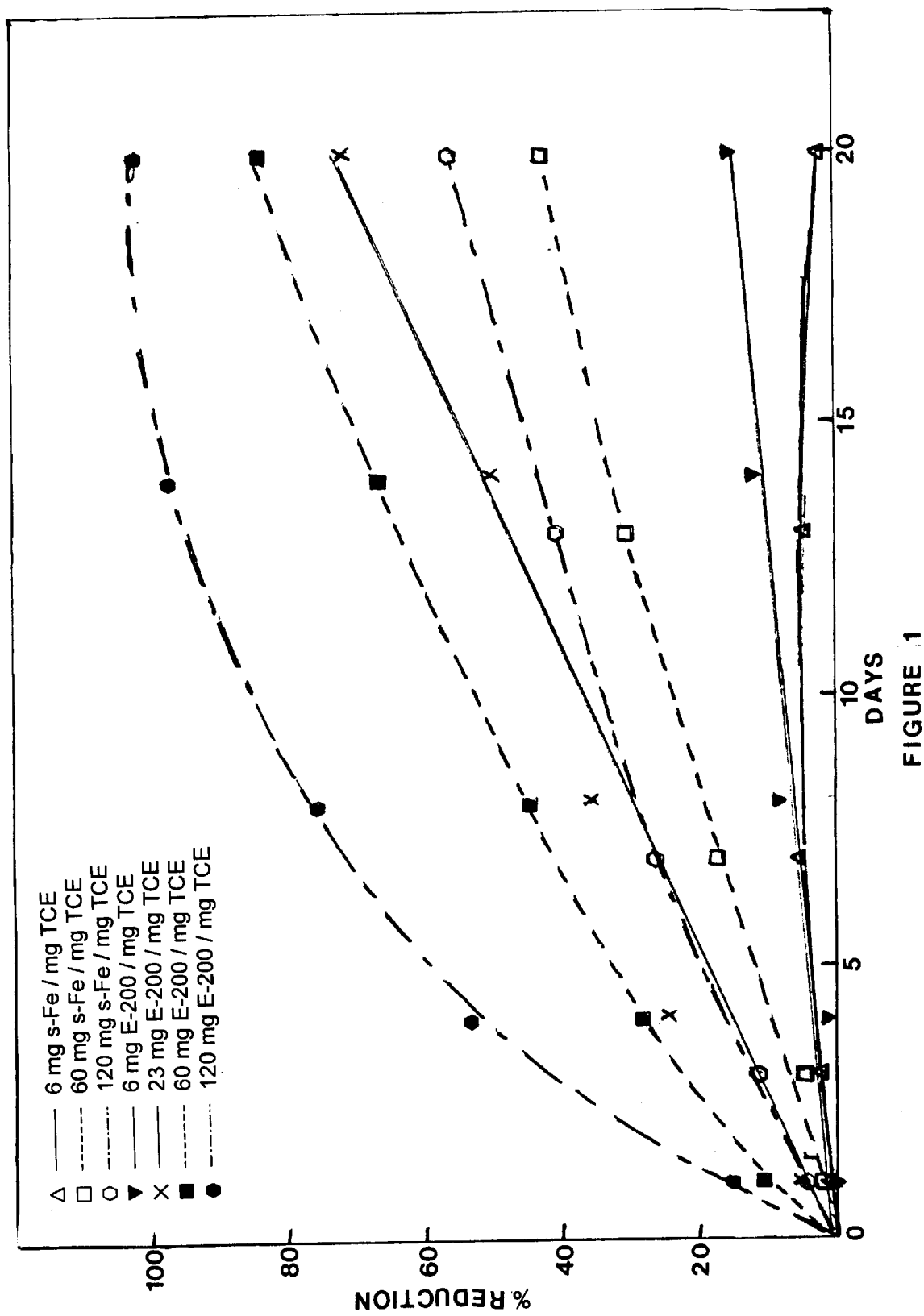
FIG. 1 shows a series of curves plotting the degree of reduction of a contaminant (TCE) being treated verses time for two different iron powder types used in different weight ratios of iron powder to contaminant present in each test.

This invention provides the means to treat in place and achieve targeted reduction and dehalogenation rates of mobile dissolved and non-mobile soil absorbed and free product phase heavy metal cations and halogenated hydrocarbons that exist in subsurface geological formations. Preferably, predetermined minimal quantities of reactive zero valent iron powder as defined by laboratory treatability studies, are injected into the geological formations being treated. Use of minimal quantities of zero valent iron in powder reduces remediation costs and minimizes production of excess hydrogen.

Reduction of Toxic Heavy Metal Cations

Laboratory measurements show that the oxidation of zero valent iron powder in the presence of water, under slightly acidic conditions and in contact with toxic heavy metal cations more noble than iron, results in the following oxidation/reduction reactions through transfer of electrons from the oxidation of the zero valent iron powder to the cations.

$$2H^+ + Fe^0 \rightarrow H_2 + Fe^{+2} \quad (1)$$

$$2H_2O + Fe^0 \rightarrow H_2 + 2(OH)^- + Fe^{+2} \quad (2)$$

$$Cr^{+6} + 3Fe^0 \rightarrow Cr^{+3} + 3Fe^{+2} \quad (3)$$

$$Cu^{+2} + Fe^0 \rightarrow Cu^0 + Fe^{+2} \quad (4)$$

$$Ni^{+2} + Fe^0 \rightarrow Ni^0 + Fe^{+2} \quad (5)$$

$$Cd^{+2} + Fe^0 \rightarrow Cd^0 + Fe^{+2} \quad (6)$$

$$Pb^{+2} + Fe^0 \rightarrow Pb^0 + Fe^{+2} \quad (7)$$

The reduction of the toxic heavy metal cations to their native state reduces the hazards poised by these compounds because of the low solubility of the reduced compounds which decreases their toxicity, mobility and the ability to spread subsurface hazardous conditions through migration in groundwater within geological formations. For example, U.S. regulations consider soil contaminated with $7.8 \times 10^4$ ppm $Cr^{+3}$ does not require remediation, yet soil containing 15 ppm $Cr^{+6}$ requires remediation.

The above reactions indicate, stoichiometrically, that the reduction of 1 milligram (mg) of heavy metal cations requires the quantities of zero valent iron powder listed in Table 1.

TABLE 1

| Contaminant | Ion | Iron Powder (mg) |
|---|---|---|
| Chrome | $Cr^{+6}$ | 3.2 |
| Copper | $Cu^{+2}$ | 0.9 |
| Nickel | $Ni^{+2}$ | 1.0 |
| Cadmium | $Cd^{+2}$ | 0.5 |
| Lead | $Pb^{+2}$ | 0.3 |

The selection of the actual quantities of iron powder used in the field is described hereafter.

Reaction Of Halogenated Hydrocarbons With Iron Powder

We have discovered, by monitoring pH as a function of time in solutions prepared with different quantities of iron powder relative to the quantity of halogenated hydrocarbons, that the halogens in halogenated hydrocarbons are replaced with hydrogen produced from the reduction of hydrogen ions resulting from the oxidation of iron powder. These results are contrary to the accepted belief that the dehalogenation of the halogenated hydrocarbons occur through direct transfer of electrons from oxidation of the iron to cause the reduction of the halogenated hydrocarbons to non toxic forms.

The dehalogenation of halogenated hydrocarbons by hydrogen produced from the reduction of hydrogen ion by the iron according to equation (8) indicates desirability of the surface of the iron powder particles being porous, so as to act as a sorbent, and to this end, preferably to contain constituents such as carbon that possess additional sorbent properties. These sorption constituents on the iron surface retain the hydrogen at the particle surface so as to make the hydrogen available for reaction with the halogenated hydrocarbons. As shown in FIG. 9, this reaction is represented for TCE in contact with the iron powder as follows:

$$2H^+ + Fe^0 \rightarrow H_2 + Fe^{+2} \quad (8)$$

$$C_2HCl_3(TCE) + 3H_2 \rightarrow C_2H_4 + 3Cl^- + 3H^+ \quad (9)$$

These reactions indicate, stoichiometrically, that the reduction of 1 mg of TCE requires 1.3 mg of zero valent iron.

The results of monitoring in the laboratory pH changes associated with iron powder oxidation, water and hydrogen ion ($H^+$) reduction, and TCE (as representative of halogenated hydrocarbons) as a function of time were carried out using weight ratios (iron to TCE) prepared from two different zero valent iron powders. These results are presented in Table 2 and 3 respectively.

Two iron powder types, designated E-200 and S—Fe possessing different specific surface area and carbon content were utilized. The E-200 and S—Fe zero valent iron powders have specific surface areas of 0.6 meter$^2$/gm and 0.05 meter$^2$/gm with carbon contents of 0.6% and 0% by weight, respectively. The 0.6% carbon by weight in the E-200 iron powder is determined to contribute an adsorptive surface area of 2.4 meter$^2$/gm to the 3.0 meter$^2$/gm total specific surface area of the E-200 as measured by BET.

The weight ratios employed in the tests are significantly above the stoichiometric requirements of 1.3 mg of zero valent iron powder needed to dehalogenate 1 mg of TCE. The effects on the pH of the reaction products as a function of time when using different weight ratios of iron to TCE is presented in Table 2 for the E-200 iron powder and in Table 3 for the S—Fe iron powder.

TABLE 2

(E-200 Iron)

| Weight Ratio Time (days) | 6 mg/Fe⁰/mg TCE pH | 23 mg Fe⁰/mg TCE pH | 60 mg Fe⁰/mg TCE pH | 120 mg Fe⁰/mg TCE pH |
|---|---|---|---|---|
| 0 (initial) | 5.4 | 5.4 | 5.4 | 5.4 |
| 3 | 6.7 | 5.9 | 6.2 | 5.9 |
| 5 | 6.6 | 5.7 | 6.0 | 5.7 |
| 7 | 6.2 | 5.6 | 5.7 | 5.6 |
| 14 | 6.1 | 5.6 | 5.7 | 5.7 |

The initial increase in pH in three days (see Table 2) to a maximum indicates that the reduction of water in the presence of E-200 is producing hydroxyl ions which results in increases in the pH according to Equation 10.

$$2H_2O + Fe^0 \rightarrow H_2 + 2(OH^-) + Fe^{+2} \quad (10)$$

Afterwards, the pH decreases because of the production of excess quantities of hydrogen ions resulting from the dehalogenation of TCE (see Equation 9). The decrease in pH was observed for all weight ratios listed in Table 2. Taken together, and as hereinafter discussed, the pH data indicates that the weight ratios of E-200 iron used were all effective for dehalogenating the TCE.

TABLE 3

S—Fe Iron

| Weight Ratio Time (days) | 6 mgs-Fe/mg TCE pH | 12 mgs-Fe/mg TCE pH | 60 mgs-Fe/mg TCE pH | 120 mgs-Fe/mg TCE pH |
|---|---|---|---|---|
| 0 | 5.3 | 5.3 | 5.3 | 5.3 |
| 3 | 8.2 | 7.4 | 6.5 | 6.2 |
| 5 | 8.0 | 7.2 | 6.2 | 6.0 |
| 7 | 8.7 | 6.0 | 6.2 | 6.0 |
| 14 | 8.5 | 6.7 | 6.0 | 6.0 |

In Table 3, for S—Fe iron, it is noted that the pH also increased during the initial three days for all the weight ratios listed. This indicates, as previously noted, that water is being reduced by the iron powder according to Equation (10). After three days, however, only the weight ratios of 12, 60 and 120 produce decreases in pH associated with the production of hydrogen ion and dehalogenation of TCE according to equation 9. Apparently, the 6 weight ratio does not provide sufficient iron powder to dehalogenate the TCE and produce H⁺ (according to equation 9) and reduce the pH of the solution. With the 6 weight ratio, the pH is observed to increase from 5.3 to 8.2 in three days and remains over 8.0 for the duration of the 14-day test period. This means that with the S—Fe iron, the weight ratio of 6, while well above the stoichiometric ratio required (i.e. 1.3, as previously described), does not provide sufficient iron for properly dehalogenating the TCE.

Two conclusions are made; one is that there is a minimum or threshold quantity of iron required, well in excess of the stoichiometric amount, for proper dehalogenation of TCE (as well as other hydrocarbons) and that the minimum amount is a function of the reactivity of the iron powder. Such reactivity is now discussed.

Parameters that Influence the Reactivity of Zero Valent Iron Powder

As examples of the reduction and dehalogenation reactions of the heavy metal cations and halogenated hydrocarbons, the reactivity of the iron powder was measured by comparing the % reduction of TCE as a function of time for different weight ratios of iron to TCE using E-200 zero valent iron powder and S—Fe zero valent iron powder. The zero valent iron powders exhibited specific surface areas of 0.6 meter²/gm and 0.05 meter²/gm and contained carbon in amounts of 0.6% and 0% by weight, respectively.

The % TCE reduction as a function of time was measured in solutions of 100 ml of water containing 10 mg of TCE or 50 mg of TCE using different quantities of zero valent iron powder to provide weight ratios (iron to TCE) of 6, 23, 60 and 120. The results are presented in FIG. 1 were obtained over a test period of 20 days. If the reactions were conducted for a sufficient time, they would go to completion.

It is first noted that the % of TCE reduction in a given time increases with an increase in weight ratio. For example, at 20 days when the weight ratio 120 (E-200) provides reaction completion, the % TCE reduction has increased for all weight ratios with the exception of the lowest weight ratio using the S—Fe zero valent iron powder which exhibited a negligible % TCE reduction. From Table 3, it is seen that, for the weight ratio of 6 for S—Fe iron powder, the pH does not decrease significantly from its maximum value. This supports the earlier discussion that lack of a pH decrease indicates that significant dehalogenation of TCE is not occurring.

FIG. 1 shows that the rate of percent TCE reduction(% TCE reduction with time), approximates a linear relationship for the lower weight ratios 6 (E-200), 23 (E-200) and 60 (S—Fe). This linear relationship implies a zero order reaction where the rate of % TCE reduction is constant and its magnitude is dependent upon the quantity of iron available and not dependent upon the quantity of such TCE treated. For example, using these lower weight ratios, the treatment of TCE contamination levels as 10 ppm or 100 ppm results in the same quantity of TCE being remediated within a specific time.

Results obtained with higher weight ratios show that the rate of % TCE reduction is dependent both on the magnitude of the weight ratio used and the % TCE remaining to be treated (See 120 (E-200), 60 (E-200) and 120 (S—Fe) as shown in FIG. 1). Thus for example, using these higher weight ratios, the treatment of such TCE contamination levels as 10 ppm or 100 ppm, results in significantly greater quantities of the 100 ppm of TCE being treated than the 10 ppm of TCE within a specified time.

The use of very large weight ratios provides rates of % TCE reduction that are dependent upon the % TCE remaining to be treated, at a specific time and is independent of the changes in the magnitude of the weight ratio used. The significance of the above is that rates of heavy metal cation reduction and halogenated hydrocarbon dehalogenation can be regulated through the use of different higher weight ratios to achieve desired treatment of specified quantities of pollutants within given times. The selection of a specific ratio provides the minimal quantity of iron powder needed to treat a given quantity of pollutant within a specified time. The use of minimal quantities of iron powder reduces remediation cost and production of excess hydrogen that can create hazardous conditions.

It is next noted that, for the same weight ratios using the E-200 and S—Fe iron powders, the E-200 zero valent iron powder is more reactive than the S—Fe zero. This is attributed to the difference in the specific surface areas of the two powders and the presence of carbon in the E-200 powder. The specific surface area of the E-200 zero valent iron powder is 0.60 meter$^2$/gm and it contains 0.6% carbon by weight. On the other hand, the specific surface area of the S—Fe iron powder is 0.05 meter$^2$/gm and it contains no carbon by weight.

These results reflect that if the dehalogenation of the TCE is occurring at the surface of the iron powder, the rate of dehalogenation is favored by higher specific surface area of the iron powder and also by the presence of sorbents such as carbon. The sorbent properties of carbon enable retention of significant quantities of TCE and hydrogen at the surface of the iron powder. This is based upon the fact that the carbon was determined to account for 80% of the adsorption area of the E-200 iron powder as measured by BET. The 0.6% carbon by weight was determined to contribute an adsorptive surface area of 2.4 meter$^2$/gm to the 3.0 meter$^2$/gm total adsorptive surface area determined for the E-200 zero valent iron powder.

Application

The minimal quantity of zero valent iron powder required to remediate toxic heavy metal cations and halogenated hydrocarbons in a specified time period is determined on a site-by-site basis. Characterization of the site as to the type, quantity, distribution, and location of heavy metal cations and halogenated hydrocarbon present, and the physical soil type including, permeability, hydraulic conductivity and density of the geological formation provides needed information to design the insitu iron powder remediation system.

The quantity of the pollutants delineates a subsurface volume within the unsaturated and saturated zone of a geological formation that contain primary sources of heavy metal cations and halogenated hydrocarbons. In addition, the quantity of pollutants and their rate of migration within the subsurface volume, determines the quantity of iron to be introduced and the treatment time required, respectively.

Figure 2:
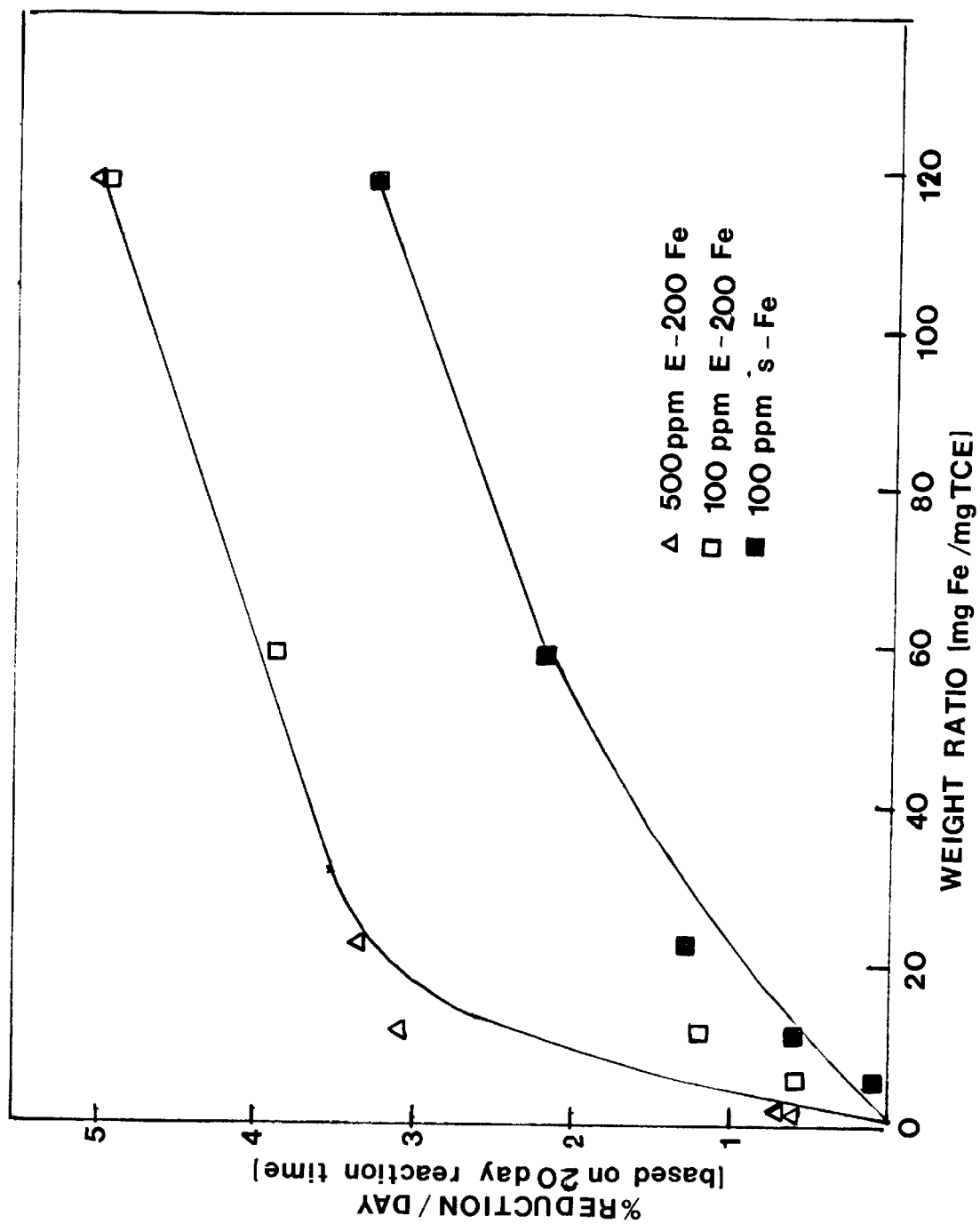
FIG. 2 shows a series of curves plotting the rate of reduction of a contaminant (TCE) being treated against weight ratios of different iron powder treating solutions containing different concentrations of the contaminant.

The quantity of iron powder needed to provide desired rates of % pollutant reduction to achieve targeted remediation within the time the pollutants remain within the subsurface volume can be determined from curves similar to those presented in FIG. 2. FIG. 2 uses TCE as representative of the reduction and dehalogenation reactions of heavy metal cations and halogenated hydrocarbons, respectively.

FIG. 2 which represents the relationship between % TCE reduction/day and weight ratio is derived from the results presented in FIG. 1. The results in FIG. 2 are based upon the % TCE reduction achieved in a treatment time of twenty days for E-200 and S—Fe iron powders employing weight ratios of 6, 23, 60 and 120 (see FIG. 1).

The non-linear portion of the curves in FIG. 2 for the lower weight ratio is encountered when the % TCE reduction is dependent only on the quantity of iron powder available for the reactions as discussed earlier.

The linear portion of the curve results when higher weight ratios are used and the percent TCE reduction is dependent upon the magnitude of the weight ratio used and the % TCE remaining, (as shown in FIG. 1).

In addition, in FIG. 2, the relationship between % TCE reduction/day with weight ratio, is the same in the linear portion regardless of the initial concentration of TCE being treated. Both the TCE concentrations at 500 ppm and 100 ppm employing the E-200 powder provided the same % TCE reduction per day regardless of the initial concentration of TCE being treated.

The quantity of E-200 iron powder required to achieve desired rates of % pollutant reduction, in subsurface volumes, within targeted remediation times using TCE as an example can be determined from the linear relationship between TCE reduction/day and the weight ratio shown in FIG. 2. By dividing the quantity of TCE present in the subsurface volume by the time it remains in the subsurface volume, based upon its rate of migration, provides the percent TCE reduction per day needed to dehalogenate the TCE to targeted levels within the specified time.

The relationship between % TCE reduction/day and weight ratio in FIG. 2 identifies the weight ratio that should be used to determine the quantity of E-200 to be introduced into the subsurface volume. The quantity of E-200 to be used can be determined by multiplying the weight ratio by the total quantity of TCE determined to be in the subsurface volume.

The relationship between the % TCE reduction per day and the weight ratio also provides the means to evaluate the reactivity of other zero valent iron powder that differ from E-200 in specific surface area, particle size distribution and sorbent content such as carbon. The reactivity of these other iron powders must be able to produce the desired % TCE reduction per day needed to achieve the desired treatment times.

Introduction of zero valence iron powder into geological formations can employ several delivery mechanisms. These can include known techniques such as deep tilling, hydraulic injection or multiphase gas/liquid injection using an inert gas such as nitrogen. The delivery mechanism is dependent upon the tightness of the formation and the quantity of zero valence iron powder required to be dispersed within the subsurface volume necessary to achieve the iron powder reactivity to provide targeted detoxification rates of heavy metal cations and reduction and dehalogenation of halogenated hydrocarbons. Deep tilling mixing is employed in loose geological formations such as sandy soil to deliver desired quantities of zero valence iron powder at different depths and over specified horizontal distances defined by the remediation volume. Tight geological formations containing clay or fractured rock would employ pressurized hydraulic injection or multiphase gas/liquid injection to overcome natural permeability limitations of the formation and in-situ cohesion stresses and deliver desired quantities of zero valence iron powder into induced or naturally occurring channels within the remediation volume at different depths and over specified horizontal distances.

Figure 3:
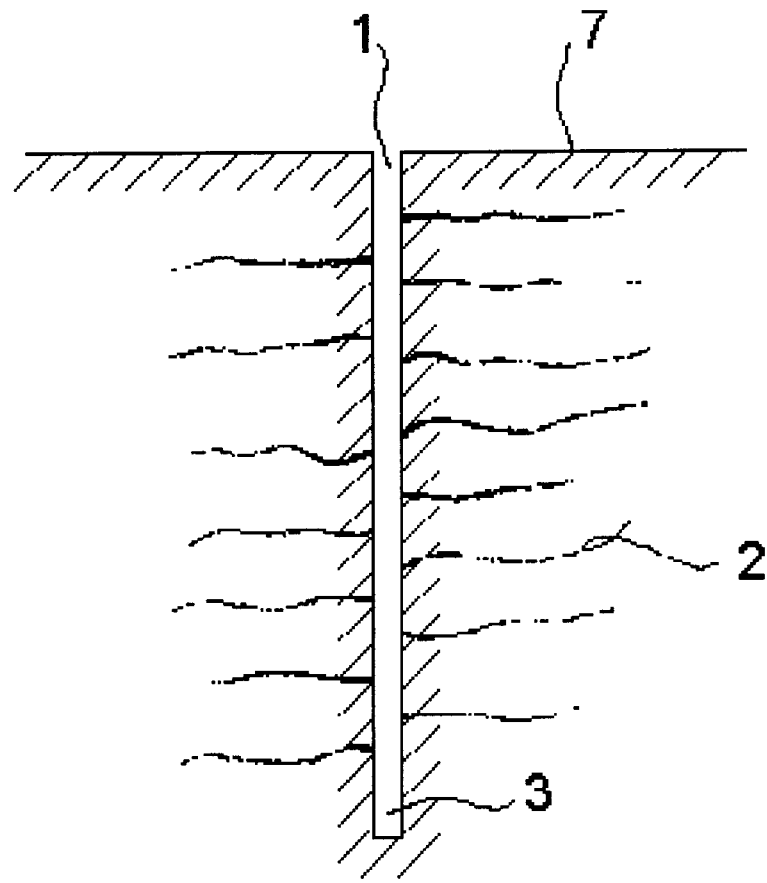
FIGS. 3 and 4 are schematic views in section and at different scale, illustrating an insitu treatment in accordance with this invention.
Figure 4:
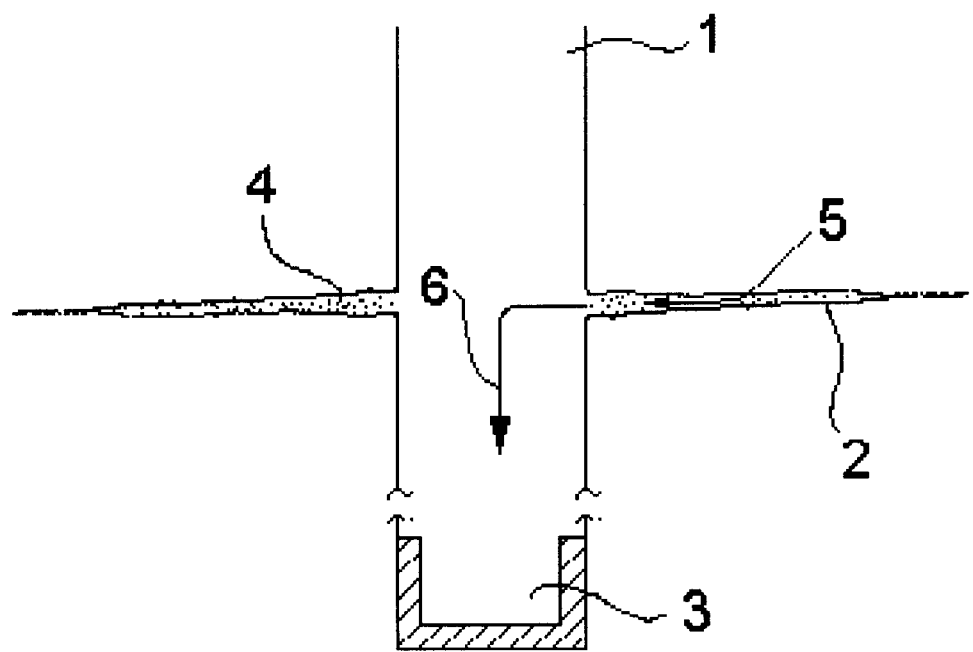

FIGS. 3 and 4 show an experimental site used to demonstrate use of the invention. A well 1 (FIG. 3) was drilled into soil containing industrial wastes, the well was capped, and pressurized fluids introduced into the well (e.g., via a vented pipe inserted into the well) for creating a series of channels 2 radiating from the well. Then (or simultaneously with the creation of the channels 2), a mixture of gases and a liquid solution containing the iron powder is injected into the channels, thus enplacing the powder therein.

In operation, as shown in greater detail in FIG. 4, contaminated groundwater flows (as indicated by the arrow 5) into the channels and into contact with the iron powder. For monitoring the process, treated groundwater is collected at the bottom of the well and periodically sampled.

In one experiment, the contaminated groundwater (which migrated at a velocity of 6 cm/hr through the channels)

contained, originally, 0.76 mg/l of $Cr^{+6}$, 1.2 mg/l total Cr, and 8.5 mg/l of $Ni^{+2}$ and exhibited a pH of 4.9.

The results of analysis of the treated groundwater removed from the well showed that the concentrations of $Cr^{+6}$ and total Chromium were reduced to trace levels and the nickel was reduced to 0.1 mg/l. The pH of the treated groundwater remained slightly acidic at 6.0 during the test period which is indicative that the iron powder was continuously active in reducing the inorganic contaminants.

Similar tests were carried out on different soils contaminated with trichloroethene (TCE) and tetrachloroethene (PCE). Analysis of the untreated groundwater showed TCE and PCE concentrations of 5 mg/l. The injection of zero valent iron powder into the channels resulted in the TCE and PCE being reduced to less than 0.1 mg/l in treated water that moved through the iron powder at a velocity of 6 cm/hr.

Invention Advantages

Iron powder injection in accordance with this invention provides the means to remediate subsurface sources of both soluble phase and non-soluble-phase toxic heavy metal cations and anions and halogenated hydrocarbons contamination in the vadose and saturated zones of geological formations that possess a wide range of permeability, hydraulic conductivity and density conditions. The oxidation of iron powder when injected and dispersed within the contaminated geological formation in specific quantities can, in the presence of water and soil electron mediators, through direct contact or indirect contact, reduce in-situ soluble and non-soluble phase toxic inorganics and dehalogenated hydrocarbons to less hazardous forms.

This invention offers such advantages as:

Reducing the amount of iron powder needed to achieve desired treatment and utilize significantly less iron powder than is used in prior art processes.

Eliminating the need for above ground surface structures and associated systems required to treat the toxic heavy metal cations, anions, and halogenated hydrocarbons removed from the subsurface geological formations.

Eliminating the requirement that the toxic inorganics and halogenated hydrocarbons be first dissolved in groundwater so that they migrate down-gradient to a reaction wall or bed for treatment.

Reducing remediation time by treating all phases or state of forms of contamination within the subsurface.

The treatment is not limited by soil permeability, hydraulic conductivity and soil density exhibited the contaminated geological formation.

What is claimed is:

1. A method for the in-situ decontamination of a given volume of soil containing one or more contaminants selected from the group consisting of soluble heavy metals more noble than iron, and soluble, insoluble and free product halogenated hydrocarbons, the method comprising introducing a quantity of zero valent iron powder directly into the soil volume, and selecting said quantity such that the rate of treatment of the contaminants, involving solely the iron powder and the amount of the contaminants present in the soil volume, yields reaction product solutions having a pH that initially increases to a maximum followed by a decrease to a level that remains relatively constantly acidic while the contaminants are being treated.

2. A method according to claim 1 wherein the weight ratio of said selected quantity of iron powder to the initial quantity of the contaminants within the soil volume falls within a range of such weight ratios which, when presented on a graph plotting such ratios versus percent decontamination with time, is linear with a positive slope.

3. A method according to claim 2 wherein the iron powder consists of particles that provide total surface areas of at least 3 $meter^2$/gram as measured by BET.

4. A method according to claim 2 wherein the particles have a carbon content of at least 0.6 percent by weight.

5. A method according to claim 2 wherein the iron is introduced into the soil volume through an injection well using a multi-phase injection system comprising a pressurized gas and a liquid solution of iron powder for injecting the iron powder through openings spaced along the length of the well directly into channels radiating away from the well.

* * * * *